United States Patent Office 2,799,483
Patented July 16, 1957

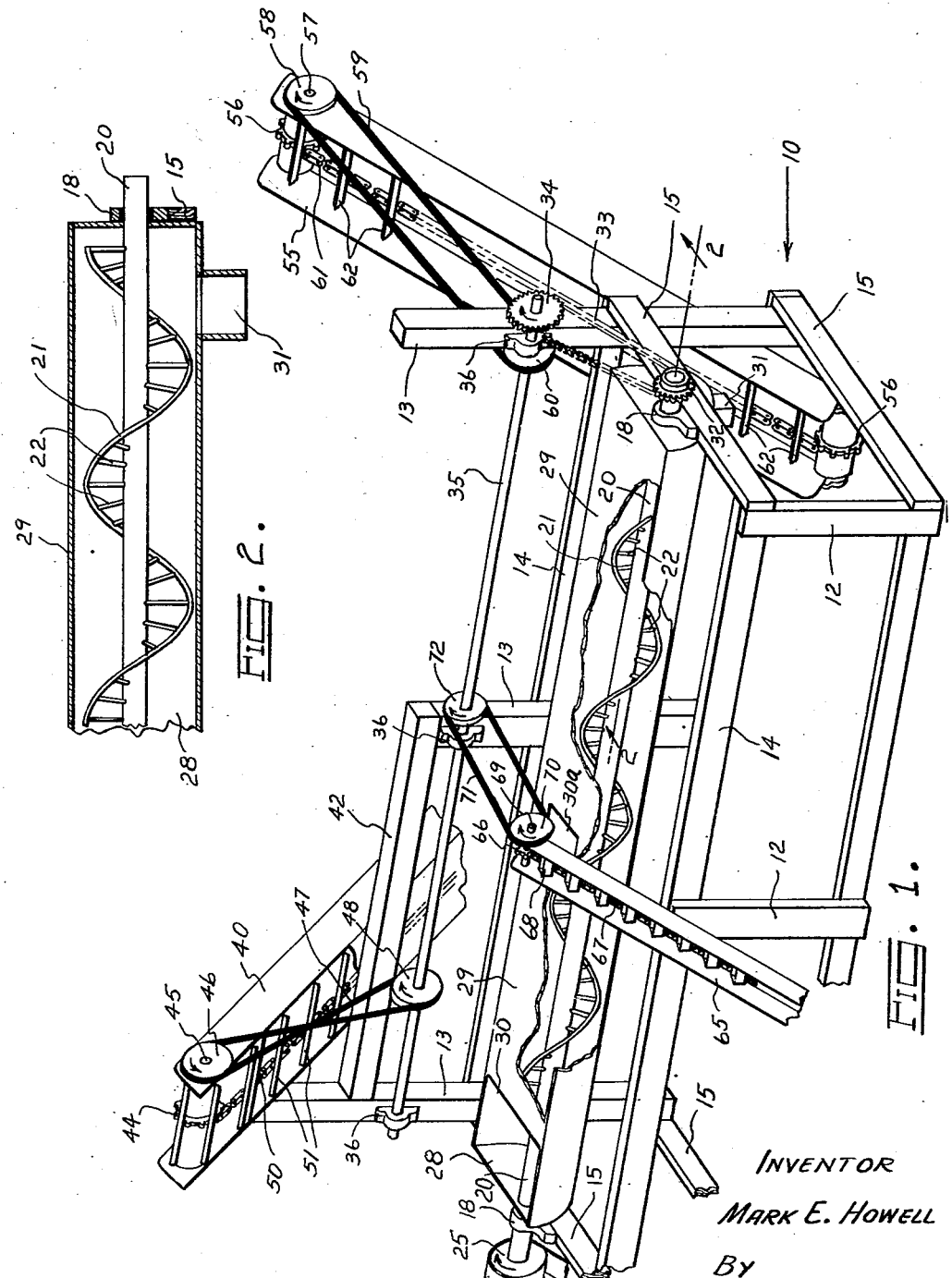

2,799,483
FEED MIXING APPARATUS
Mark E. Howell, Wilder, Idaho

Application March 17, 1955, Serial No. 494,841

1 Claim. (Cl. 259—10)

This invention relates to improvements in apparatus for mixing cattle feed with molasses or other liquid nutrient.

An important object of the invention is to provide an improved feed mixing apparatus adapted especially for individual farm use for the purpose of making available to livestock a freshly mixed feed and at the same time obviating the inconvenience and expense involved in obtaining such a product from commercial sources.

A further object is to provide a feed mixing apparatus having improved means for mixing a chopped feed with a liquid nutrient.

The foregoing objects are accomplished by an apparatus comprising a frame supporting a feed receptacle or trough of semi-cylindrical shape in cross section. The trough has disposed therein a novel mixing shaft adapted to move feed longitudinally of said trough and simultaneously to agitate said feed which has been deposited at one end thereof. A liquid nutrient is deposited onto the feed in the trough and the feed and nutrient are uniformly mixed or blended by means of the rotatable shaft. Power operated means are associated with the apparatus for depositing feed and liquid nutrient into the feed trough and for moving the mixed feed away from the apparatus.

The invention will be better understood and additional objects and advantages will become apparent from the following description taken in connection with the accompanying drawings which illustrate a preferred form of the invention. It is to be understood, however, that the invention may take other forms and that all such modifications and variations within the scope of the appended claim which will occur to persons skilled in the art are included in the invention.

In the drawings:

Figure 1 is a perspective view of the improved feed mixing apparatus of the present invention; and Figure 2 is a longitudinal sectional view showing in particular the structure of the novel mixing shaft, taken on the line 2—2 of Figure 1.

The frame of the mixing apparatus is designated generally by the numeral 10. The frame 10 comprises a plurality of upright posts 12 along one side, designated herein as the front side, and a plurality of extended posts 13 along the opposite side, designated herein as the rear side. The upright posts 12 and 13 have suitable front and rear rails 14 and end rails 15 secured thereto to form a rigid and compact structure. The frame, of course, could assume various forms of structure and the invention is not limited to the specific structure shown.

Mounted on the upper end rails 15 is a pair of bearings 18 in which is journaled a longitudinal mixing shaft 20 having a spiral rod or bar 21, which may comprise an angle iron, secured in spaced relation thereto by means of a plurality of radial spokes 22. Secured to one end of the shaft 20 is a pulley 25 engageable by a drive belt 26 driven by any suitable source, such as an electric or gas motor or the power take-off from a tractor, not shown.

The shaft 20 is disposed within a semi-cylindrical feed trough 28 having a cover 29, the trough 28 being secured in a stationary position on the frame members 15 and being adapted to receive dry feed through an opening 30 in cover 29 at its left or charging end as viewed in Figure 1 and adapted to discharge said feed, after mixing with other substances, through a bottom discharge opening 31 on its righthand end. Cover 29 has a second opening 30a intermediate the feed opening 30 and discharge opening 31 adapted to receive a liquid nutrient.

A sprocket wheel 32 is secured to the end of the shaft 20 opposite from the drive pulley 25 and this sprocket wheel is adapted to drive, by means of a chain 33, a sprocket wheel 34. Sprocket wheel 34 is secured to an auxiliary shaft 35 journaled in bearings 36 mounted on the frame posts 13, whereby the shafts 20 and 35 will rotate in the same direction at a predetermined speed ratio. Disposed at the lefthand end of the mixing apparatus is a conveyor 40 and, for supporting the conveyor in a fixed position relative to the frame, the frame is provided with a horizontal rail 42 to hold the upper end of the conveyor in overhanging relation above the mixing trough 28. The conveyor 40 comprises a flat bottom trough having a pair of end sprocket wheels 44, the bottom wheel not being shown, rotatable by a shaft 45 equipped with a pulley 46. The pulley 46 is driven by a belt 47 engageable with a pulley 48 on the auxiliary shaft 35. A chain 50 moves around sprockets 44 and has a plurality of flights 51 slidable upwardly on the flat bottom of the conveyor trough for depositing dry, cut feed, such as chopped alfalfa, into the left or charging end of mixing trough 28.

Disposed at the opposite end of the mixing apparatus from the conveyor 40 is a second similar conveyor 55 inclined in an opposite direction from the conveyor 40 and adapted to convey the mixed product, which has been discharged from the trough, into a bin or the like. The conveyor 55 has sprocket wheels 56 rotatable with upper and lower shafts 57. The upper shaft 57 has a pulley 58 which is driven by a belt 59 engageable with a pulley 60 on the shaft 35. As in the conveyor 40, a chain 61 is movable around sprocket wheels 56 and has flights 62 for carrying the mixed material over the upper end of the conveyor.

Disposed intermediate the conveyors 40 and 55 is a third conveyor or elevator 65 having an upper end overhanging the mixing trough 28 for the purpose of conveying hot molasses or other liquid nutrient from a tank or reservoir, not shown, to the feed trough 28. The conveyor 65 has end sprocket wheels 66 engaged by a chain 67 which carries a plurality of cups 68, the lower portion of the conveyor not being shown. The sprocket wheels 66 are mounted on shafts 69 and the shaft on the upper end of the conveyor has a pulley 70 thereon adapted to be driven by a belt 71 engageable with a pulley 72 secured on the auxiliary shaft 35. Cups 68 may be loaded with the liquid nutrient in any suitable manner when the conveyor 65 is operating, a preferred method being to immerse the bottom portion of the conveyor in a heated supply tank so that the cups will automatically fill themselves as they rotate around the lower sprocket wheel.

In operation of the present device, the ground feed is introduced to the conveyor 40 and the conveyor 40 discharges the material by gravity into the trough 28 at the left end thereof. With the rotation of shaft 20 and the spiral bar 21 the ground feed is moved to the right and thoroughly agitated, whereby when the liquid nutrient is introduced by gravity from the cups 68, the feed and nutrient will be thoroughly mixed into a palatable product by the time it reaches the righthand end of the trough. The mixed feed is discharged through opening 31 onto the conveyor 55 and thereupon deposited in a suitable bin or the like.

The thorough and improved mixing of the feed and liquid nutrient is accomplished by the novel arrangement and structure of the feed mixing trough and mixing shaft. The shaft 20 is disposed axially within the semi-cylindrical trough 28 and spiral bar 21 rotates with only a small clearance between it and the wall of the trough. All the feed in the trough will thereby be engaged by the rotating parts and the improved mixing feature of the present invention is accomplished by the bar 21 and radial spokes 22 which move the feed slowly toward the discharge opening and repeatedly agitate and overturn the chopped feed and liquid nutrient by a continual sifting thereof through the spokes. The thorough mixing action will be appreciated from a consideration of the following dimensions which are merely illustrative of a typical installation and are not intended to limit the invention. On a mixer shaft 12 feet long the spokes 22 are 6 inches long and spaced 4 inches apart to form an auger 10 feet long with one complete turn of bar every 3 feet along the shaft. The closely spaced spokes thereby form a slotted feed screw for intermittently advancing and overturning each particle of the loose material as the shaft revolves.

In the preferred form of the invention shown, all the various parts are movable in timed relation whereby the mixing shaft is adapted to move the ground feed away from the charging end of the trough as fast as said feed is deposited by the conveyor. Also, a delivery rate of cups 68 is established which will deposit a proper amount of liquid nutrient on the feed as the feed moves along the trough.

Various other dry feeds, such as bran or meals, may be fed to conveyor 40 along with chopped hay or alfalfa, and one of the pulleys 70 or 72 may be equipped with a clutch for stopping the molasses elevator 65 when it is desired to mix such dry feeds without molasses. The provision of clutches and variable speed drives to change the feed rate where desired will be understood by persons skilled in the art and such devices are not illustrated.

Having now described my invention and in what manner the same may be used, what I claim as new and desire to protect by Letters Patent is:

Feed mixing apparatus comprising a frame structure, an elongated semi-cylindrical trough supported in elevated position on said frame structure having an input end and a discharge end, a cover for said trough having a first opening at said input end and a second opening intermediate said ends, said trough having a gravity discharge bottom opening at said discharge end, a longitudinal mixing shaft in said trough, a single spiral bar mounted on closely spaced spokes on said mixing shaft for mixing said feed and advancing it along the trough, upright posts on one side of said frame structure extending above said trough adjacent each of said openings, a longitudinal rail supported on said posts, an inclined dry feed conveyor supported at its upper end on said rail and having an upper discharge end overhanging said first opening at the input end of said trough, an inclined liquid feed conveyor having an upper discharge end overhanging said second opening at an intermediate portion of said trough, an inclined discharge conveyor having a lower end under said bottom opening at the discharge end of said trough, an auxiliary shaft mounted on said posts above and longitudinally of said trough, drive connecting means between said auxiliary shaft and said mixing shaft, means on said auxiliary shaft for driving said conveyors, and means on one of said shafts for driving all of said conveyors and mixing shaft.

References Cited in the file of this patent

UNITED STATES PATENTS

| 752,646 | Boughton | Feb. 23, 1904 |
| 782,277 | Ruder | Feb. 14, 1905 |
| 876,408 | Stein | Jan. 14, 1908 |
| 908,609 | Radcliff | Jan. 5, 1909 |

FOREIGN PATENTS

| 859,869 | Germany | Dec. 18, 1952 |